(12) United States Patent
Russom et al.

(10) Patent No.: US 11,038,950 B2
(45) Date of Patent: Jun. 15, 2021

(54) BLOCKCHAIN DIGITAL TWIN FOR TRANSACTIONS ON BEHALF OF LIMITED CAPABILITY DEVICES

(71) Applicant: MICROSOFT TECHNOLOGY LICENSING, LLC, Redmond, WA (US)

(72) Inventors: Miriam Berhane Russom, Bellevue, WA (US); Eustace Ngwa Asanghanwa, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 162 days.

(21) Appl. No.: 16/103,385

(22) Filed: Aug. 14, 2018

(65) Prior Publication Data
US 2020/0059510 A1 Feb. 20, 2020

(51) Int. Cl.
*H04L 29/08* (2006.01)
*H04L 12/911* (2013.01)
*H04L 29/06* (2006.01)

(52) U.S. Cl.
CPC ............ *H04L 67/10* (2013.01); *H04L 47/70* (2013.01); *H04L 63/0428* (2013.01); *H04L 63/08* (2013.01)

(58) Field of Classification Search
CPC ..... H04L 67/104; H04L 63/123; H04L 63/00; H04L 67/108; H04L 9/0618; H04L 9/14;
(Continued)

(56) References Cited

U.S. PATENT DOCUMENTS

2007/0130352 A1 6/2007 Chhabra et al.
2018/0007131 A1 1/2018 Cohn et al.
(Continued)

FOREIGN PATENT DOCUMENTS

WO 2012141677 A1 10/2012
WO 2018126340 A1 7/2018
(Continued)

OTHER PUBLICATIONS

Heber, et al., "Towards a Digital Twin: How the Blockchain can Foster E/E-traceability in Consideration of Model-Based Systems Engineering", In Proceedings of the 21st International Conference on Engineering Design Product, Services and Systems Design, Aug. 21, 2017, pp. 321-330.
(Continued)

*Primary Examiner* — Hitesh Patel
(74) *Attorney, Agent, or Firm* — Holzer Patel Drennan (57) ABSTRACT

A digital twin may be configured to perform blockchain transactions on behalf of a device with limited memory, limited compute power, and/or limited internet connectivity. A method for performing such a blockchain transaction includes hosting a digital twin for the capability limited device that has a unique identifier matching a unique identifier of the digital twin such that actions performed by the digital twin are attributable to the capability limited device. The method further includes receiving input for a set of blockchain operations at the system capable of performing the blockchain operations, from the capability limited device. The method further includes performing the set of blockchain operations at the system capable of performing the blockchain operations using the digital twin and the unique device identifier, such that performance of the set of blockchain operations is attributed to the capability limited device.

14 Claims, 4 Drawing Sheets

(58) Field of Classification Search
CPC ....... H04L 41/50; H04L 9/16; G06Q 2220/00; G06Q 20/405; G06Q 20/223
See application file for complete search history.

(56) References Cited

U.S. PATENT DOCUMENTS

| | | | |
|---|---|---|---|
| 2018/0108024 A1* | 4/2018 | Greco | H04L 9/0637 |
| 2019/0045354 A1* | 2/2019 | Polehn | H04B 1/3816 |
| 2019/0109702 A1* | 4/2019 | Maggu | G06Q 20/06 |
| 2019/0166101 A1* | 5/2019 | Ramos | G06F 21/645 |
| 2019/0318327 A1* | 10/2019 | Sowell | H04L 63/123 |
| 2019/0319808 A1* | 10/2019 | Fallah | H04L 9/30 |
| 2019/0372834 A1* | 12/2019 | Patil | H04L 41/0806 |
| 2019/0394267 A1* | 12/2019 | Bistram | H04L 67/108 |

FOREIGN PATENT DOCUMENTS

| | | | | |
|---|---|---|---|---|
| WO | 2018126344 A1 | 7/2018 | | |
| WO | WO-2018126340 A1 * | 7/2018 | ............... | H04L 9/32 |

OTHER PUBLICATIONS

"International Search Report and Written Opinion Issued in PCT Application No. PCT/US2019/038822", dated Sep. 4, 2019, 13 Pages.

\* cited by examiner

BLOCKCHAIN DIGITAL TWIN FOR TRANSACTIONS ON BEHALF OF LIMITED CAPABILITY DEVICES

BACKGROUND

Background and Relevant Art

Computers and computing systems have affected nearly every aspect of modern living. Computers are generally involved in work, recreation, healthcare, transportation, entertainment, household management, etc.

Further, computing system functionality can be enhanced by a computing system's ability to be interconnected to other computing systems via network connections. Network connections may include, but are not limited to, connections via wired or wireless Ethernet, cellular connections, or even computer to computer connections through serial, parallel, USB, or other connections. The connections allow a computing system to access services at other computing systems and to quickly and efficiently receive application data from other computing systems.

Interconnection of computing devices has facilitated implementation of blockchain technology. Blockchain technology is a distributed method of securely performing smart transactions. In particular, an entity can request that a transaction be performed. The transaction is performed and validated by a network of nodes. Once validated, the transaction is added to a blockchain ledger in a way that makes the added transaction permanent in the ledger, in that it cannot be changed or removed.

Blockchain technology requires use of devices with rich compute and storage resources at the nodes as well as good connectivity to the blockchain network. Constrained devices, such as IoT devices with poor network connectivity, are therefore typically excluded from participating in blockchain networks. In particular, a device requesting a transaction needs to have sufficient computing power and consistent access to the blockchain network to be able to perform complex calculations within a limited amount of time. Therefore, blockchain is used in highly compute capable devices that can solve complex math, and store large distributed ledgers. It also requires many nodes (a device on the blockchain network=participant) and hence a highly reliable connectivity is needed for available nodes In particular, smart transactions typically have certain constraints. For example, one such constraint is that the transaction be completed in a limited period of time. Such time may be in the 0 to 10 seconds range. Typically, these smart transactions include complex computations. Thus, it can be difficult to complete the smart transactions in the limited period of time on a phone or other device that has limited computing capabilities and may have intermittent connections, thus preventing it from completing the smart transactions performed in a blockchain network in the required time.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method of performing blockchain operations on behalf of a capability limited device that is unable to perform the blockchain operations. The method includes hosting a digital twin for the capability limited device on a system capable of performing the blockchain operations. The capability limited device includes a unique device identifier. The digital twin also includes the unique device identifier, such that actions performed by the digital twin are attributable to the capability limited device. The method further includes receiving input for a set of blockchain operations at the system capable of performing the blockchain operations, from the capability limited device. The method further includes performing the set of blockchain operations at the system capable of performing the blockchain operations using the digital twin and the unique device identifier, such that performance of the set of blockchain operations is attributed to the capability limited device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Embodiments illustrated herein are directed to allowing a constrained device that previously could not participate in blockchain transaction (due to constraints such as lack of computing power, lack of storage, lack of consistent network connectivity to a blockchain network, etc.), to participate in such transactions. This is accomplished by implementing a digital twin of the constrained device, where the digital twin comprises sufficient computing power, storage, and/or connectivity to a blockchain network to participate in blockchain transactions. The digital twin comprises a device identifier that matches the constrained device such that actions performed by the digital twin can be attributed to the constrained device.

Currently, blockchain nodes are required to perform complex blockchain math. However, a constrained device may not be able to perform the complex blockchain math.

Currently, blockchain nodes are required to store a complete copy of a distributed ledger. However, a constrained device may not have enough storage capacity to participate in blockchain transactions.

Currently, blockchain nodes are required to constantly, or at least consistently with some predetermined threshold, connect to a blockchain network to verify each new transaction added to the blockchain. However, an unreliable network may preclude this. Additionally, while typically a blockchain network requires many participating devices to build trust and transparency, poor connectivity limits number of participating devices, and thus works against this requirement, Embodiments can address many of these issues using various features. For example, instead of directly using a constrained device as a node in the blockchain network, embodiments use a digital twin of the constrained device. The digital twin is implemented in a way to such that the digital twin has sufficient computing, storage, connectivity, etc. to be a participant in the blockchain network. Thus, the digital twin will serve as a node in the blockchain network representing the constrained device. This solves compute, and storage challenges.

Additionally or alternatively, instead of requiring that the constrained device be a constantly connected participating node, the digital twin of the constrained device can perform these actions on behalf of the constrained device and limit the signal between twin and constrained device to simpler interactions, such as initiating contracts or transmitting information. This addresses the need for reliance on constant connectivity of the constrained device.

For example, embodiments may be implemented in regions where the devices comprise resource (e.g., computing and/or storage) constrained devices and/or handicapped (by poor connectivity) devices.

Consider the following scenario descriptions related to the coffee and cocoa economies, where beans are shipped from farmers largely in developing regions of the world to consumers all over the world.

In the illustrated scenario example, farmers may only be able to afford feature phones (constrained devices) that operate on unreliable low bandwidth networks (e.g. SMS only with frequent network outages). A local roaster may have the economic resources and high bandwidth connection to set up an intelligent edge device like Azure® IoT Edge from Microsoft, Corporation of Redmond, Wash. to host digital twins of farmers' devices in a given geography.

In Azure® cloud, the digital twin could be an extension of, for example, the IoT Hub or an Azure® IoT Edge device twin.

Blockchain technology can be used to revolutionize commodity trading for commodity producers who have historically not had access to commodity clearinghouse markets. For example, farmers in developing countries may like to use blockchain technology to directly access commodity clearinghouse markets, but use of blockchain for this purpose is stalling for lack of capable devices and high bandwidth connectivity. Some embodiments illustrated herein can overcome various challenges by systems and methods that leverage blockchain technology with existing constrained devices and network connectivity limitations.

Indeed, the majority of the world's supply of commodity products like coffee and cocoa are farmed by subsistence or small scale industrial farmers from the developing regions of the world. The product supply chain from farm to cup involves many players. Different abilities to access markets or other different market leverage factors, often affect assignment of distribution of compensation and risk to various entities along the supply chain in disproportionate ways. For example, farmers bear the majority of market and systemic risks resulting from natural events like droughts, disruptions in distribution pipelines, disruption in labor markets, natural disasters, etc. However, much of the profits in the industry are distributed to middlemen traders and others who bear less risk. Thus, Farmers receive comparatively less value from a supply chain that comprises roasters, wholesalers, transporters, brokers, and barristers.

Additionally, health conscious and responsible consumer trends show a sharp rise in demand for knowledge of the source of their products right to the farm and possibly farmer. This can be accomplished through transparent tracing.

Farmers may find it useful to know which of their products command premium pricing to help fine tune quality. This can be achieved through transparent fast signaling from farmer to consumer.

Blockchain technology offers solution paths to this and other challenges in other areas thanks to many attributes that include:

transparency through a distributed ledger;
irreversibility of records in the distributed ledger;
peer-to-peer transmission; and
speed through smart contracts in lieu of central clearinghouses.

Many companies are already engaged in appropriate blockchain solutions. However, blockchain technology demands stringent technology requirements such as:

compute power rich devices to timely process complex computational logic;
storage rich devices to store complete copies of the growing distributed ledger;
high bandwidth connectivity for peer-to-peer real time ledger updates and democratic decision making; and
continuous connectivity of many nodes (other devices) for effectiveness.

However, a limited capability technology base of developing regions of the world characterized by constrained IoT devices (feature and limited smart phones), and unreliable network infrastructure of minimal bandwidth (2G and 3G technologies) limits the ability to implement blockchain networks in these and other areas. Indeed, in general, an inherent challenge with IoT is that devices are often computing and storage resource limited, and devices only occasionally connect networks. This is often true, even in IoT networks in more technologically developed regions.

Figure 1:
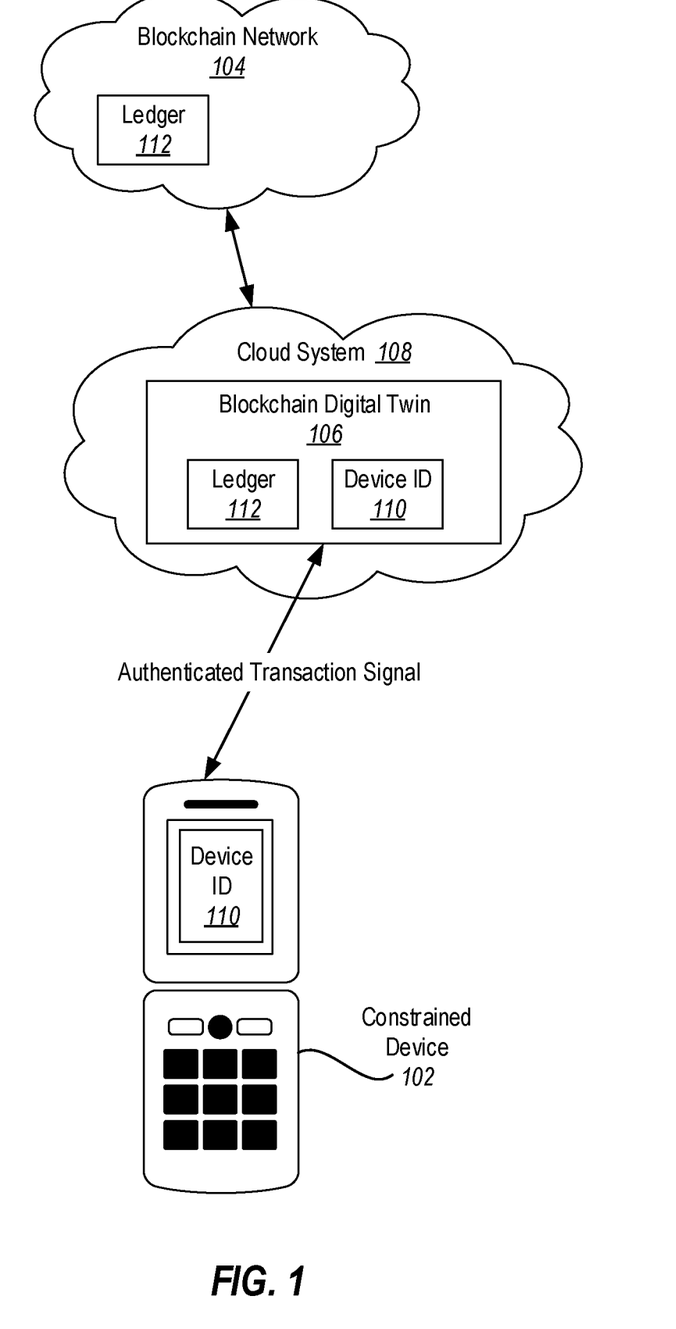
FIG. 1 illustrates using a digital twin in a cloud system to allow a capability limited device to participate in a blockchain network.

Embodiments illustrated herein can nonetheless use blockchain technology despite these technology constraints. Referring now to FIG. 1, one example embodiment is illustrated. FIG. 1 illustrates a constrained device 102. In the example illustrated in FIG. 1, the constrained device 102 is a feature phone. However, it should be appreciated that the constrained device 102 may be any one of a number of different devices. For example, the constrained device 102 may be a smart phone, but simply a smart phone with reduced functionality or reduced ability to connect to a blockchain network 104. The constrained device 102 may be an IoT device that has limited computing functionality, limited storage capacity, or limited connectivity that would ordinarily prevent the constrained device 102 from effectively participating in the blockchain network 104.

FIG. 1 further illustrates a digital twin 106 of the constrained device 102 in a cloud system 108. For example, the cloud system 108 may have the owner of the constrained device 102 as a tenant in the cloud system 108. The cloud system 108 can then allocate various resources such as compute resources, storage resources, and/or network resources that can be utilized on behalf of the owner of the constrained device 102. As illustrated in FIG. 1, the cloud system 108 is coupled to the blockchain network 104. Further, the cloud system 108 comprises compute resources that are capable of performing the complex calculations required for participation in the blockchain network 104. The cloud system 108 further comprises storage resources that are able to store the ledger 112 for participation in the blockchain network 104. The cloud system 108 is connected through network components, such as various network interface cards, routers, switches, or other network hardware, to the blockchain network 104 allowing the cloud system 108 to be connected to the blockchain network 104 with the consistency of connection required for participation in the blockchain network 104.

As noted, the owner of the constrained device 102 may be a tenant of the cloud system 108. The tenant can be allocated the appropriate compute resources, storage resources, and network connections from the cloud system 108 to be able to participate in the blockchain network 104.

However, is also desirable that the constrained device 102 be able to be a participant in the smart transactions performed in the blockchain network 104. This can be accomplished by creating the digital twin 106 of the constrained device 102. The constrained device 102 comprises a device ID 110. The digital twin 106 also comprises the same device ID 110. This allows the digital twin 106 act as a proxy on behalf of the constrained device 102. In particular, the digital twin 106, using the compute resources, storage resources, and network connectivity of the cloud system 108 can participate in the blockchain network 104 for, and in behalf of the constrained device 102. This allows the blockchain network 104 to treat the constrained device 102 as if it is a valid member of the blockchain network 104.

Illustrating now an example of functionality that may be implemented, the user at the constrained device 102 can input data into the constrained device 102. For example, the user could input data indicating a desire to sell goods or services at a certain price. In particular, this would be information that would be entered into the blockchain ledger 112. For example, assume that the constrained device 102 is a simple feature phone. The user at the constrained device 102 could simply text certain information to a particular number that included an SMS messaging system coupled to the blockchain digital twin 106. The text message could include the relevant parameters to be entered into the ledger 112. An SMS message could be sent to the digital twin 106 or other intermediary service that could communicate with the digital twin 106. The digital twin 106 could then use this information to communicate with the blockchain network 104 to attempt to have the information provided by the constrained device 102 input into the ledger 112. The digital twin 106 could then perform the various calculations and storage required by the blockchain network 104 with respect to the information provided by the constrained device 102. In particular, the blockchain network 104 will require the digital twin 106 to perform complex computations within some predetermined time. The digital twin 106 will perform the complex computations on behalf of the constrained device 102 allowing the constrained device 102 to effectively participate in the blockchain network by having the digital twin 106 perform the "heavy lifting" on behalf of the constrained device 102.

Note that the constrained device 102 may be configured to both send and receive information for participation in the blockchain network 104. For example, the user at the constrained device 102 may be able to request information from the digital twin 106 using text messaging. In particular, certain keywords or text to certain numbers may be understandable by the digital twin 106 (or some other entity coupled to the digital twin 106) as requests for information. For example, the constrained device 102 may be configured to request information about entries in the ledger 112. Constrained device 102 may request this information through an appropriate text message with appropriate keywords, or addressed to an appropriate endpoint. The digital twin 106 has a copy of the ledger at the cloud system 108, and thus can identify the information desired by the constrained device 102. The digital twin 106 can obtain this information, provide the information to the constrained device 102, where the user of the constrained device 102 can then consume the information.

Figure 2:
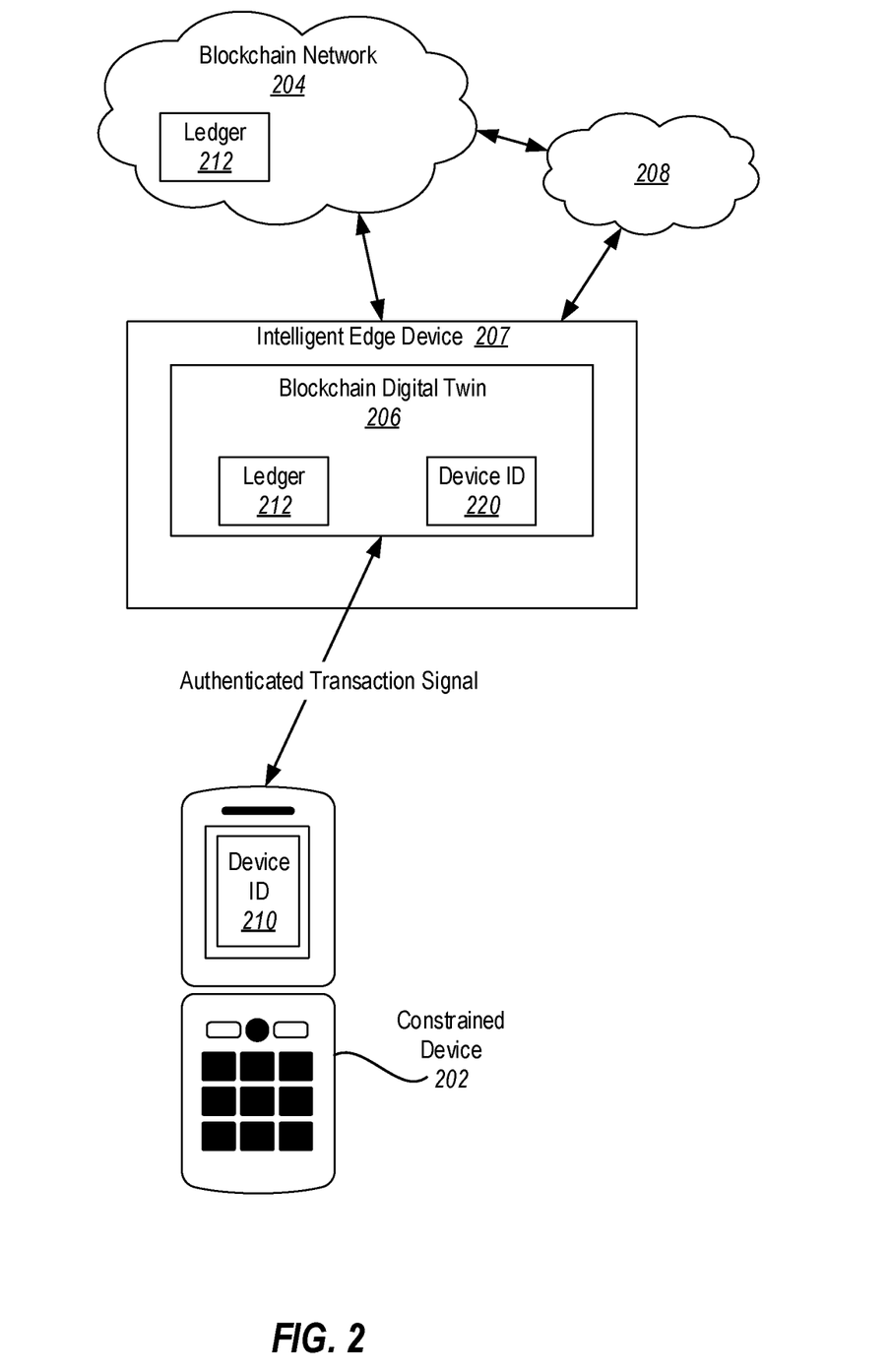
FIG. 2 illustrates using a digital twin in an intelligent edge device to allow a capability limited device to participate in a blockchain network.

FIG. 2 illustrates an alternative or additional embodiment. In this example, the digital twin 206 is implemented in an intelligent edge device 207. An intelligent edge device is a device where certain functionality from a cloud system, such as cloud system 208, is implemented in an appliance device such as the intelligent edge device 207. In particular, certain computing, storage, network, or other functionality that is typically implemented in a cloud system 208 can be moved to the intelligent edge device 207 where the functionality can be utilized as if it were part of the cloud system 208. The intelligent edge device 207 is a physical device comprising processors, storage (such as memory, or mass storage), network devices such as network interface cards, etc. The intelligent edge device 207 can be stored in a given physical location where the resources are located in the given physical location rather than in a nebulous cloud environment. In some embodiments, the intelligent edge device 207 is an Azure® IoT Edge device available from Microsoft®, Corporation of Redmond, Wash.

FIG. 2 illustrates the digital twin 206 implemented on the intelligent edge device 207. As with the previous example, the intelligent edge device 207 includes sufficient computing power, storage space, and network connectivity to participate in the blockchain network 204. In this way, the intelligent edge device 207 can store the ledger 212 from the blockchain network 204, perform the intelligent transactions required by the blockchain network 204, and maintain the connectivity needed with the blockchain network 204 to participate in the blockchain network 204.

In the example illustrated a user of a constrained device 202 may input data into the constrained device 202. This data may be sent to the digital twin 206 through SMS or other messaging techniques that allow the constrained device 202 to be coupled to the intelligent edge device 207, and hence the digital twin 206. As in the previous example, the digital twin 206 comprises a device ID 210 that matches the device ID of the constrained device 202. In this way the intelligent edge device 207 can participate in the blockchain network 204 on behalf of the constrained device 202. The constrained device 202 serves as a means for providing input into the digital twin 206 but does not need to perform the computation and storage functions ordinarily required by the blockchain network 204, as those are performed by the digital twin 206.

Note that in the example illustrated in FIG. 2, the intelligent edge device 207 may connect directly to the brought blockchain network 204. Alternatively or additionally, the intelligent edge device 207 may connect through a cloud system 208 which connects the digital twin 206 to the blockchain network 204.

Figure 3:
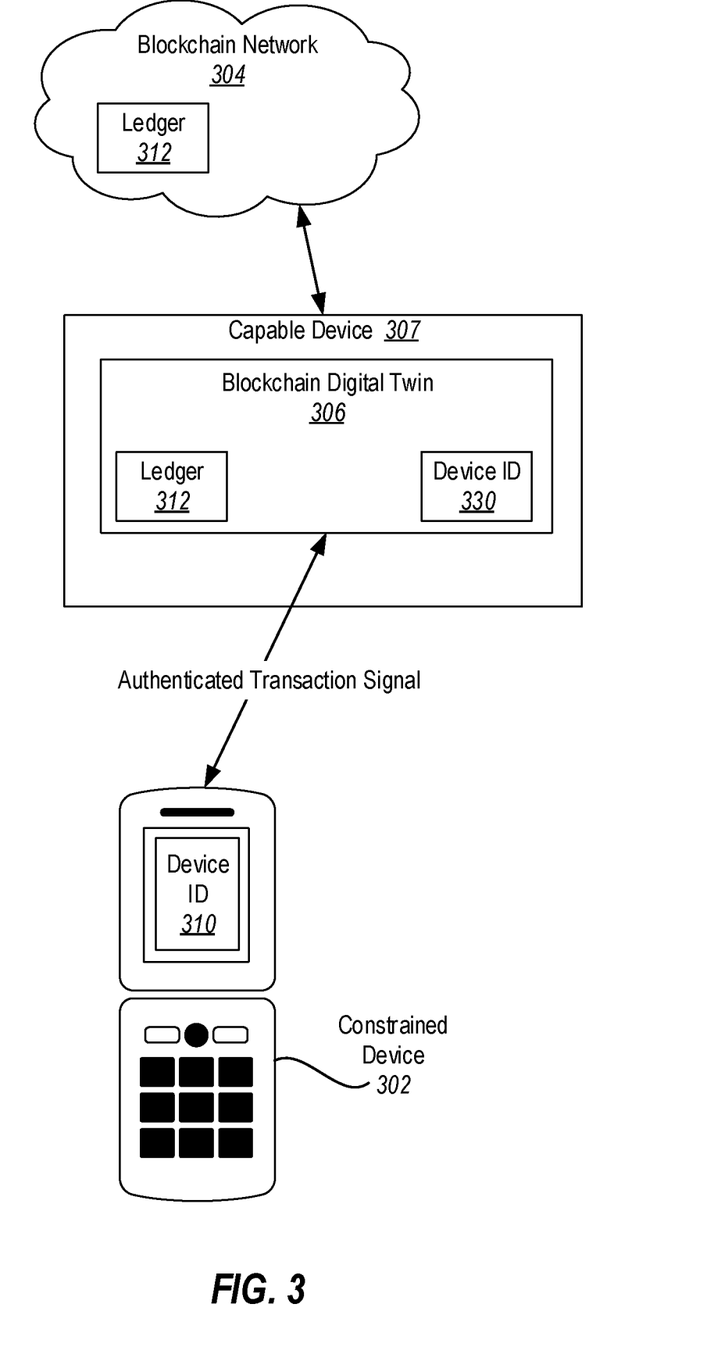
FIG. 3 illustrates using a digital twin in a capable device to allow a capability limited device to participate in a blockchain network.

Referring now to FIG. 3, an alternative or additional embodiment is illustrated. In this example a capable device 307 is implemented. The capable device 307 may simply be a computer system implemented at a home or business. The capable device comprises sufficient computing power, storage, and network connectivity to connect to the blockchain network 304. In some embodiments, the capable device 307, may simply be a general-purpose computing system modified to include a digital twin 306, The capable device 307 may have a digital twin 306 implemented on the capable device 307 that is a digital twin of the constrained device 302. Similar to the examples above, the constrained device 302 may be configured to connect to the capable device 307 to provide input to the digital twin 306 which participates in the blockchain network 304. In particular, the digital twin 306 stores the ledger 312 and performs the smart transactions required by the blockchain network 304.

In this example, the constrained device 302 may be configured to communicate with the capable device 307 in a number of different ways. For example, the constrained device 302 and the capable device 307 may be on the same Wi-Fi or other network, and thus be able to communicate with each other. Alternatively or additionally, the constrained device 302 may be configured to be connected to the capable device 307 through a docking station or other connection. In this way, the constrained device 302 can transmit input data to the digital twin 306 to be entered into the ledger 312. Additionally, the constrained device 302 may be configured to indicate to the digital twin 306 that it desires to receive information from the digital twin 306. Such information may be information in the ledger 312 or other information about the blockchain network 304.

As discussed previously, in some embodiments the constrained device may be an IoT device. In such embodiments the connection between the constrained device and its digital twin may be through various IoT centric networks. For example, in some embodiments, the connection may be through a BACnet connection for examples when the constrained device is part of the building control network or other similar network. Alternatively or additionally the connection between the constrained device in the digital twin may be based on a Bluetooth connection, RFID scanning, or other intermittent or data limited connection modalities.

As illustrated above, the digital twin serves as the blockchain node for all blockchain transactions on behalf of the constrained device. The digital twin then utilizes the computational resources of the cloud, edge device, or other capable computing device. Embodiments relegate the actual constrained device to the role of signal initiator. Thus, for example in the scenarios illustrated herein, the farmer simply uses the constrained device as means to signal a transaction to be performed by blockchain network using the digital twin. The signal could be communicated over simple networks, like SMS, befitting an unreliable networking infrastructure.

Note that connections between the constrained device on the digital twin are authenticated. This can be accomplished in a number of different fashions. For example, in some embodiments simply the fact that the constrained device 102 knows an endpoint to reach the digital twin may be sufficient to authenticate the connection between the constrained device in the digital twin. Alternatively or additionally, messages may be sent using certificates or other verifiable proof. In some embodiments, the messages between the constrained device in the digital twin are encrypted to secure the messages.

Embodiments may be effective as they transfer the computational burden from constrained or handicapped device to its digital twin. Further, embodiments may reduce connectivity requirements of a constrained device to just signaling with its digital twin, with no ledger updates being required by the constrained device itself. This is most befitting with operation in low bandwidth and unreliable networks. Further, embodiments transfer storage burdens to the more resource rich digital twin.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 4:
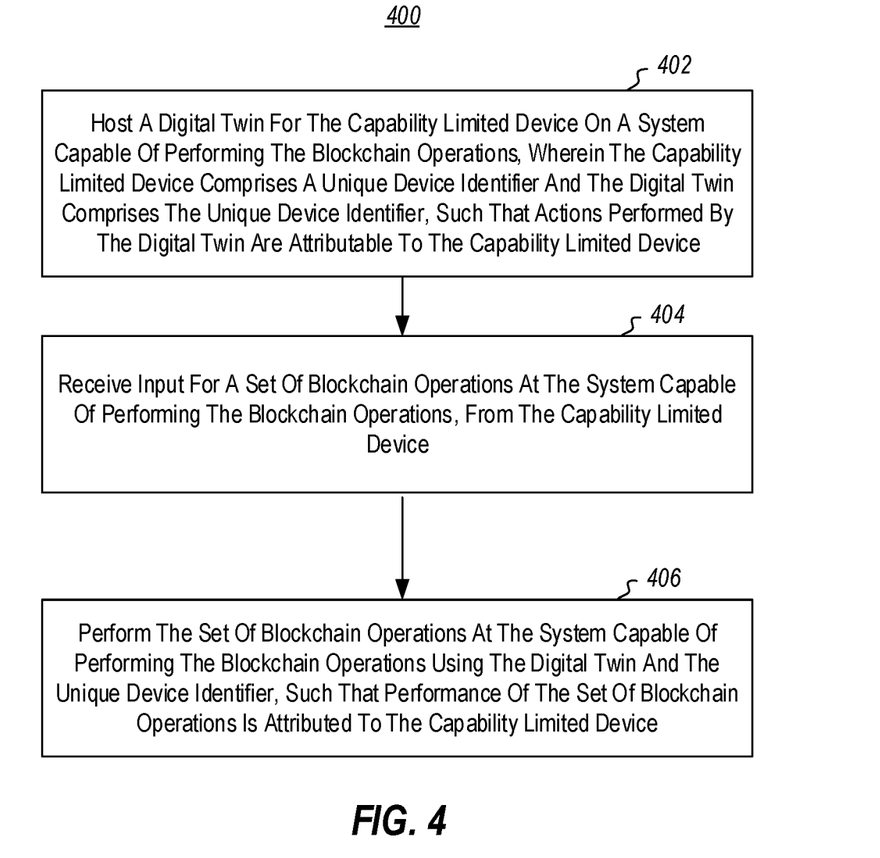
FIG. 4 illustrates a method of performing blockchain operations on behalf of a capability limited device that is unable to perform the blockchain operations.

Referring now to FIG. 4, a method 400 is illustrated. The method 400 includes acts for performing blockchain operations on behalf of a capability limited device that is unable to perform the blockchain operations. The method includes hosting a digital twin for the capability limited device on a system capable of performing the blockchain operations, wherein the capability limited device comprises a unique device identifier and the digital twin comprises the unique device identifier, such that actions performed by the digital twin are attributable to the capability limited device (act 402).

The method 400 further includes receiving input for a set of blockchain operations at the system capable of performing the blockchain operations, from the capability limited device (act 404).

The method 400 further includes performing the set of blockchain operations at the system capable of performing the blockchain operations using the digital twin and the unique device identifier, such that performance of the set of blockchain operations is attributed to the capability limited device (act 406).

The method 400 may be practiced where the system capable of performing the blockchain operations is capable of performing the blockchain operations by performing the blockchain operations in an amount of time required for the blockchain operations, where the capability limited device is unable to perform the blockchain operations in the amount of time required for the blockchain operations.

The method 400 may be practiced where the system capable of performing the blockchain operations is capable of performing the blockchain operations by having a certain level of computing capabilities required for performing the blockchain operations, where the capability limited device does not have the level of computing abilities required for performing the blockchain operations.

The method 400 may be practiced where the system capable of performing the blockchain operations is capable of performing the blockchain operations by having certain information required for performing the blockchain operations, where the certain information is not available to the capability limited device. For example, the system capable for performing the blockchain operations may have the information from the blockchain ledger. Alternatively, or additionally, the system capable for performing the blockchain operations may have a key, token, password, and/or other piece of information not available to the capability limited device.

The method 400 may be practiced where the system capable of performing the blockchain operations comprises tenant resources in a cloud-based system. An example of this is illustrated in the description of FIG. 1.

The method 400 may be practiced where the system capable of performing the blockchain operations comprises an edge computing system that is able to connect to a blockchain network. An example of this is illustrated in FIG. 2.

The method 400 may be practiced where performing the set of blockchain operations comprises storing a blockchain ledger. For example, FIGS. 1, 2, and 3 illustrate storing a blockchain ledger 112, 212, or 312 at a blockchain digital twin 106, 206, or 306 respectively.

The method 400 may be practiced where performing the set of blockchain operations comprises performing a particular computation within a given period of time.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system comprising:
   one or more processors; and
   one or more computer-readable media having stored thereon instructions that are executable by the one or more processors to configure the computer system to perform blockchain operations on behalf of a capability limited device that is unable to perform the blockchain operations, including instructions that are executable to configure the computer system to perform at least the following:

host a digital twin for the capability limited device on a system capable of performing the blockchain operations, wherein the capability limited device comprises a unique device identifier that matches a device identifier of the digital twin such that actions performed by the digital twin are attributable to the capability limited device;

receive input for a set of blockchain operations at the system capable of performing the blockchain operations, from the capability limited device, the capability limited device being unable to perform the blockchain transactions due to at least one of limited storage capacity, limited computing capability, and limited internet connectivity; and perform the set of blockchain operations at the system capable of performing the blockchain operations using the digital twin and the unique device identifier such that performance of the set of blockchain operations is attributed to the capability limited device, at least one computation of the set of blockchain operations being performed within a given period of time.

2. The computer system of claim 1, wherein the system capable of performing the blockchain operations is capable of performing the blockchain operations by performing the blockchain operations in an amount of time required for the blockchain operations, where the capability limited device is unable to perform the blockchain operations in the amount of time required for the blockchain operations.

3. The computer system of claim 1, wherein the system capable of performing the blockchain operations is capable of performing the blockchain operations by having a certain level of computing capabilities required for performing the blockchain operations, where the capability limited device does not have the level of computing abilities required for performing the blockchain operations.

4. The computer system of claim 1, wherein the system capable of performing the blockchain operations is capable of performing the blockchain operations by having certain information required for performing the blockchain operations, where the certain information is not available to the capability limited device.

5. The computer system of claim 1, wherein the system capable of performing the blockchain operations comprises tenant resources in a cloud-based system.

6. The computer system of claim 1, wherein the system capable of performing the blockchain operations comprises an edge computing system that is able to connect to a blockchain network.

7. The computer system of claim 1, wherein performing the set of blockchain operations comprises storing a blockchain ledger.

8. A method of performing blockchain operations on behalf of a capability limited device that is unable to perform the blockchain operations, the method comprising:

hosting a digital twin for the capability limited device on a system capable of performing the blockchain operations, wherein the capability limited device comprises a unique device identifier that matches a device identifier of the digital twin such that actions performed by the digital twin are attributable to the capability limited device;

receiving input for a set of blockchain operations at the system capable of performing the blockchain operations, from the capability limited device, the capability limited device being unable to perform the blockchain transactions due to at least one of limited storage capacity, limited computing capability, and limited internet connectivity; and performing the set of blockchain operations at the system capable of performing the blockchain operations using the digital twin and the unique device identifier such that performance of the set of blockchain operations is attributed to the capability limited device, at least one computation of the set of blockchain operations being performed within a given period of time.

9. The method of claim 8, wherein the system capable of performing the blockchain operations is capable of performing the blockchain operations by performing the blockchain operations in an amount of time required for the blockchain operations, where the capability limited device is unable to perform the blockchain operations in the amount of time required for the blockchain operations.

10. The method of claim 8, wherein the system capable of performing the blockchain operations is capable of performing the blockchain operations by having a certain level of computing capabilities required for performing the blockchain operations, where the capability limited device does not have the level of computing abilities required for performing the blockchain operations.

11. The method of claim 8, wherein the system capable of performing the blockchain operations is capable of performing the blockchain operations by having certain information required for performing the blockchain operations, where the certain information is not available to the capability limited device.

12. The method of claim 8, wherein the system capable of performing the blockchain operations comprises tenant resources in a cloud-based system.

13. The method of claim 8, wherein the system capable of performing the blockchain operations comprises an edge computing system that is able to connect to a blockchain network.

14. The method of claim 8, wherein performing the set of blockchain operations comprises storing a blockchain ledger.

* * * * *